United States Patent [19]
Villagran et al.

[11] Patent Number: 6,048,567
[45] Date of Patent: *Apr. 11, 2000

[54] HIGHER DENSITY FOAMABLE INSTANT COFFEE PRODUCTS FOR PREPARING CAPPUCCINO LIKE BEVERAGES

[75] Inventors: Francisco Valentino Villagran, West Chester; Glenn James Dria; David Joseph Bruno, Jr., both of Hamilton; Leonard Edwin Small, Cincinnati, all of Ohio

[73] Assignee: The Procter & Gamble Company, Cinncinnati, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/796,356

[22] Filed: Feb. 7, 1997

[51] Int. Cl.⁷ .................................. A23F 5/00; A23J 3/00
[52] U.S. Cl. .......................... 426/594; 426/564; 426/569; 426/567; 426/590
[58] Field of Search .................... 426/594, 564, 426/639, 640, 650, 658, 661, 569, 567, 590

[56] References Cited

U.S. PATENT DOCUMENTS

| | | | |
|---|---|---|---|
| 3,672,909 | 6/1972 | Berry et al. | 426/443 |
| 4,438,147 | 3/1984 | Hedrick, Jr. | 426/570 |
| 4,579,742 | 4/1986 | Lavie | 426/96 |
| 4,746,527 | 5/1988 | Kuypers | 426/569 |
| 4,748,040 | 5/1988 | Kuypers | 426/596 |
| 4,986,994 | 1/1991 | Baccus, Jr. | 426/330.3 |
| 5,069,924 | 12/1991 | Baccus, Jr. | 426/590 |
| 5,350,591 | 9/1994 | Canton | 426/564 |
| 5,378,480 | 1/1995 | Carieri | 426/67 |
| 5,433,962 | 7/1995 | Stipp | 426/96 |
| 5,462,759 | 10/1995 | Westerbeck et al. | 426/568 |
| 5,780,092 | 4/1998 | Agbo et al. | 426/569 |

FOREIGN PATENT DOCUMENTS

| | | | |
|---|---|---|---|
| 44 07 361 A1 | 3/1994 | Germany | A23F 5/24 |
| WO 94/16579 | 8/1994 | WIPO | A23L 2/40 |
| WO 96/08153 | 3/1996 | WIPO | A23C 1/04 |

*Primary Examiner*—Mary E. Mosher
*Assistant Examiner*—Ali R. Salimi
*Attorney, Agent, or Firm*—Karen F. Clark; Jacobus C. Rasser

[57] ABSTRACT

A foamable instant coffee product having a density of at least about 0.4 g/cc and comprising, instant coffee, a densified non-foaming creamer, an acid and a carbonate or bicarbonate salt to generate carbon dioxide, a foaming creamer, a proteinaceous foam stabilizer, and other optional ingredients such as sweeteners, milk solids, flavorants, thickeners, etc. This product is preferably made by compacting the non-foaming creamer, acid, carbonate/bicarbonate salt and instant coffee and then combining this compacted, densified material with the remaining ingredients. Alternatively, this product can be made by compacting the non-foaming creamer, acid and carbonate/bicarbonate salt, extruding the instant coffee and sweetener (e.g., sugar) and then combining the compacted and extruded materials with the remaining ingredients.

21 Claims, No Drawings

HIGHER DENSITY FOAMABLE INSTANT COFFEE PRODUCTS FOR PREPARING CAPPUCCINO LIKE BEVERAGES

TECHNICAL FIELD

The present application relates to foamable instant coffee products for preparing cappuccino like beverages. More specifically, the present application relates to foamable instant coffee products for preparing sugar sweetened cappuccino like beverages that have a higher density so that they can be spooned out like conventional sugar sweetened flavored instant coffee powders.

BACKGROUND OF THE INVENTION

Espresso or expresso type coffee beverages have become extremely popular in recent years. Espresso-type coffee is typically made from the dark-roasted beans, (e.g., Viennese roast, French-type roast, Italian-type roast) which have a distinct, almost-burnt appearance and smell, with droplets of coffee oil formed on the surface of the beans. These darkly-roasted beans have considerably less acidity and aromas, are more brittle and hence are subject to finer grinding and higher extraction rates, and have a higher fatty acid content than the lighter roasts.

The method for making espresso type coffee is different from common methods for making drip-type or percolation coffee. The espresso process involves forcing hot water or steam under pressure through a packed bed of extra finely ground coffee made from these espresso coffee beans. Besides the espresso coffee grounds, this packed bed can include flavorants such as cinnamon, cocoa, etc.

Espresso coffee is a dark full bodied brew. One popular variant of espresso coffee is cappuccino. Cappuccino is a beverage in which espresso coffee is mixed or topped with steamed milk or cream. Cappuccino is usually made by first brewing espresso as described above, and then pouring a layer of foamed milk over the espresso in the cup. Indeed, cappuccino uses the foamed milk as a primary ingredient. In order to make the foamed milk, air is intermixed with the milk in the presence of steam so that the milk is "emulsified," i.e., foamed or frothed, and heated at the same time. Other "classic" espresso beverages that use foamed or frothed milk include caffe latte, and espresso macchiato. The milk provides flavor, texture, as well as garnish for these espresso beverages. Espresso beverages made with foamed or frothed milk can also include other flavorants such as cocoa, e.g., mocha type.

Espresso and especially cappuccino coffee beverages are typically prepared utilizing relatively expensive and specialized equipment. This has often limited the availability of such beverages to restaurants, specialty coffee shops and the like. In addition, considerable operator skill is required in preparing the foamed or frothed milk at the heart of cappuccino beverages. The specialized equipment, lengthy preparation time and skill required to prepare cappuccino type espresso beverages can be an impediment to private or in-home consumption.

Instant espresso type, and especially instant cappuccino type, coffee products are a relatively new entrant to the coffee beverage market. Prior cappuccino type instant coffee products usually contain a mixture of instant coffee powder, creamer, sweetener, and flavorings. See PCT application 95/10360 (Agbo et al), published Mar. 21, 1996. Foam is typically generated in such products by including a foaming type creamer where a gas is incorporated into the creamer. See PCT application 95/10360; U.S. Pat. No. 5,433,962 (Stipp), issued Jul. 18, 1995; European Patent 458,310 (Vogt et al), published Nov. 27, 1991 and German Patent Application 4,407,361 (Ledermann), published Sep. 7, 1995. See also U.S. Pat. No. 4,438,147 (Hedrick), issued Mar. 20, 1984 and U.S. Pat. No. 5,462,759 (Westerbeek et al), filed Jul. 13, 1993, issued Oct. 31, 1995, which disclose gasified foaming creamers.

A problem in including foaming creamers in instant cappuccino type products is their low density. The density of foaming creamers is typically in the range of from about 0.18 to about 0.30 g/cc. When included at levels of at least about 20% to generate sufficient foam, the resulting instant cappuccino type coffee products (sugar sweetened) typically have densities in the range of from about 0.3 to about 0.4 g/cc. By contrast, conventional sugar sweetened flavored instant coffee products typically have densities in the range of from about 0.55 to about 0.70 g/cc. This means that sugar sweetened instant cappuccino type coffee products containing foaming type creamers cannot be spooned out on the same volume basis as conventional flavored instant coffee products. Instead, sugar sweetened instant cappuccino type coffee products are often formulated as single serving packages because of the large volume of product required to prepare a drinkable beverage.

Conversely, limiting the amount of foaming creamer in the instant coffee product can cause insufficient foam to be generated, especially at levels below about 10%. To assist in foam formation, components have been included in instant cappuccino type coffee products that will generate carbon dioxide when mixed with water. See PCT application 95/10360 and German Patent Application 4,407,361. See also U.S. Pat. No. 5,350,591 (Canton), issued Sep. 27, 1994 which discloses a foaming creamer composition that contains components for generating carbon dioxide. However, the carbon dioxide that is generated will be lost fairly rapidly because it does not remain entrapped within the foam bubbles.

In addition, prior instant cappuccino type products suffer from other problems. During handling or shipping of these products, the foaming creamer is subjected to mechanical forces that can break down its structure. As a result, the entrapped gas can be lost, thus decreasing or even negating the ability to generate foam in the beverage.

DISCLOSURE OF THE INVENTION

The present invention relates to foamable coffee products having a density of at least about 0.4 g/cc. These foamable instant coffee products comprise:

a. from about 1 to about 40% instant coffee having a density of at least about 0.2 g/cc;

b. from about 10 to about 90% of a non-foaming creamer having a density of at least about 0.5 g/cc;

c. from about 1 to about 20% of a foaming creamer;

d. from about 0.1 to about 60% of a proteinaceous foam stabilizer;

e. from about 0.1 to about 5% of an edible water-soluble acid;

f. from about 0.1 to about 5% of an edible water-soluble carbonate or bicarbonate salt that evolves carbon dioxide when it reacts with the acid;

g. optionally up to about 20% milk solids;

h. optionally from about 0.05 to about 10% of a thickener;

i. optionally an effective amount of a sweetener;

j. optionally an effective amount of a flavorant.

The present invention further relates to a method for making such foamable instant coffee products. This method comprises the steps of:

(a) densifying to at least about 0.75 g/cc a mixture comprising:
   (1) a non-foaming creamer;
   (2) an edible water-soluble acid;
   (3) an edible water-soluble carbonate or bicarbonate salt that evolves carbon dioxide when it reacts with the acid;
   (4) optionally sweetener;
(b) combining the densified mixture with:
   (1) a foaming creamer;
   (2) a proteinaceous foam stabilizer;
   (4) optionally milk solids;
   (5) optionally a thickener
   (6) optionally a flavorant.
(c) where at least one of mixtures (a) and (b) comprises instant coffee.

The present invention further relates to an alternative method for making such foamable instant coffee products. This alternative method comprises the steps of:

(a) densifying to least about 0.5 g/cc a mixture comprising:
   (1) a non-foaming creamer;
   (2) an edible water-soluble acid;
   (3) an edible water-soluble carbonate or bicarbonate salt that evolves carbon dioxide when it reacts with the acid;
(b) extruding a second mixture comprising:
   (1) sugar; and
   (2) instant coffee;
(c) combining the densified mixture of step (a) and the extruded mixture of step (b) with:
   (1) a foaming creamer;
   (2) a proteinaceous foam stabilizer;
   (3) optionally milk solids;
   (4) optionally a thickener;
   (5) optionally a flavorant.

The foamable instant coffee products of the present invention provide desirable foamed or frothy beverages, including cappuccino like beverages. The foamy, frothy top generated by these products lasts a relatively long time due to the inclusion of the proteinaceous foam stabilizer. These foamable instant coffee products have a higher density similar to that of conventional flavored instant coffee products. As a result, the foamable instant coffee products of the present invention, especially those that are sugar sweetened, can be spooned out to provide a drinkable beverage similar to these conventional coffee products.

DETAILED DESCRIPTION OF THE INVENTION

A. Definitions

As used herein, the terms "instant coffee" and "soluble coffee" are used interchangeably to refer to coffee products that are relatively soluble in water, especially hot water.

"Bulk density" refers to the overall density of a plurality of particles measured in the manner described on pp. 127–131 of Coffee Processing Technology, Avi Publishing Company, Westport, Conn., 1963, Vol. II.

The terms "moisture" and "water" are used interchangeably herein.

All particle sizes referred to herein are based on the U.S. Standard Sieve Screen Series. See page 701 of Sivetz & Desrosier, Coffee Technology (Avi Publishing Co. 1979).

As used herein, the term "foam" refers to a light frothy mass formed in or on the surface of the coffee beverage.

As used herein, the term "comprising" means various components and processing steps can be conjointly employed in the foamable instant coffee products and process for preparing these products according to the present invention. Accordingly, the term "comprising" encompasses the more restrictive terms "consisting essentially of" and "consisting of."

All amounts, parts, ratios and percentages used herein are by weight unless otherwise specified.

B. Sources of Ingredients Used in Foamable Instant Coffee Products

The instant coffee used in the foamable instant coffee products of the present invention can be prepared by any convenient process. A variety of such processes are known to those skilled in the art. Typically, instant coffee is prepared by roasting and grinding a blend of coffee beans, extracting the roast and ground coffee with water to form an aqueous coffee extract, and drying the extract to form instant coffee. Instant coffee useful in the present invention is typically obtained by conventional spray drying processes. Representative spray drying processes that can provide suitable instant coffee are disclosed in, for example, pages 382–513 of Sivetz & Foote, Coffee Processing Technology, Vol. I (Avi Publishing Co. 1963); U.S. Pat. No. 2,771,343 (Chase et al), issued Nov. 20, 1956; U.S. Pat. No. 2,750,998 (Moore), issued Jun. 19, 1956; and U.S. Pat. No. 2,469,553 (Hall), issued May 10, 1949, all of which are incorporated by reference. Other suitable processes for providing instant coffee for use in the present invention are disclosed in, for example, U.S. Pat. No. 3,436,227 (Bergeron et al)., issued Apr. 1, 1969; U.S. Pat. No. 3,493,388 (Hair), issued Feb. 3, 1970; U.S. Pat. No. 3,615,669 (Hair et al), issued Oct. 26, 1971; U.S. Pat. No. 3,620,756, (Strobel et al), issued Nov. 16, 1971; U.S. Pat. No. 3,652,293 (Lombana et al), issued Mar. 28, 1972, all of which are incorporated by reference. In addition to spray dried instant coffee powders, instant coffee useful in the present invention can include freeze-dried coffee. The instant coffee can be prepared from any single variety of coffees or a blend of different varieties. The instant coffee can be decaffeinated or undecaffeinated and can be processed to reflect a unique flavor characteristic such as expresso, French roast, or the like.

Suitable creamers for use in the foamable instant coffee products of the present invention include dairy and non-dairy creamers. Suitable dairy creamers include whole milk solids, butterfat solids, low-fat dry milk, non-fat dry milk, dry mixes used to prepare ice cream, milkshakes, and frozen desserts, as well as mixtures of these dairy creamers. Suitable non-dairy creamers can be made from a variety of fats and oils including soybean and partially hydrogenated soybean oil, partially hydrogenated canola oil, hydrogenated and partially hydrogenated coconut oil, as well as other hydrogenated vegetable oils, or combinations of such oils. Preferred creamers include non-dairy creamers made from vegetable oils, emulsifier, carbohydrates, sodium caseinate, and buffers. Additional creamers suitable for use in the present invention include those synthetic and imitation dairy products disclosed in Kirk Othmer Encyclopedia of Chemical Technology, W. J. Harper, Willey Interscience, 3rd edition, Vol. 22, section entitled "Synthetic and Imitation Dairy Products," pp. 465–498, (1978).

Both foaming and non-foaming creamers are used in the instant coffee products of the present invention. Foaming creamers suitable for use in the present invention can comprise a non-dairy fat (e.g., partially hydrogenated oil), a water soluble non-dairy carbohydrate (e.g., sucrose, dextrose, maltose, corn syrup solids and mixtures thereof), a buffer, a proteinaceous foam stabilizing agent (e.g., sodium caseinate) and optionally a gum thickener. These solid components are mixed with water and then homogenized. A gas (e.g., nitrogen) is injected or blended into this mixture and the mixture spray dried to provide the foaming creamer. See U.S. Pat. No. 4,438,147 (Hedrick, Jr.), issued Mar. 20, 1984; U.S. Pat. No. 5,462,759 (Westerbeek et al), issued Oct. 31, 1995. Non-foaming creamers suitable for use in the present invention have an ingredient composition similar to that of the foaming creamers but without the incorporated gas. Also, foaming creamers typically have more proteinaceous components (typically about 12–13% of total ingredients) relative to non-foaming non-dairy creamers (typically about 3.5% of total ingredients).

The foamable instant coffee products of the present invention also include a proteinaceous foam stabilizer. Suitable proteinaceous foam stabilizers include egg white albumin (ovalbumin), whey protein, soy protein, soy protein isolate, corn protein isolate, as well as mixtures of these stabilizers. Dried egg white albumin is particularly preferred because of its ability to form better and more stable foams at relatively low concentrations. The other proteinaceous foam stabilizers (e.g., whey protein) are typically effective only at much higher concentrations than egg white albumin.

These proteinaceous foam stabilizers decrease the surface tension so as to form continuous films due to complex intermolecular interactions to prevent rupture of the foam bubbles. Basically, the foam stabilizer acts as macromolecular surfactant that provides multiple anchor or contact points at the air-water interface of the foam bubbles that are generated when the products of the present invention are mixed with water to form the beverage. Proteins with rapid adsorption and unfolding at the air-water interface produce better foams than proteins that adsorb slowly and resist unfolding at the interface. Unfolding and the ability to form thicker and more cohesive films depends on the elasticity of the protein which is further related to the flexibility of the protein in the adsorbed layer, i.e., proteins that exhibit high elasticity have very low flexibility. The greater stability of foams where egg white is used is due to the high concentration of rigid globular proteins present that have higher flexibility (i.e., caused by disulfide bonds in protein). Egg white typically has at least 40 different globular glycoproteins with ovalbumin accounting for usually about 54% of these glycoproteins.

Foamable instant coffee products according to the present invention comprise an edible water-soluble acid (organic or inorganic). Suitable acids include citric acid, malic acid, tartaric acid, fumaric acid, succinic acid, phosphoric acid, as well as mixtures of these acids. In combination with these acids, the instant coffee products according to the present invention further comprise an edible water-soluble carbonate or bicarbonate salt that evolves carbon dioxide when it reacts with the acid. Suitable carbonate or bicarbonate salts include sodium bicarbonate, sodium carbonate, potassium bicarbonate, potassium bicarbonate, as well as mixtures of these salts. Sodium carbonate and bicarbonate are especially preferred when used in combination with citric acid. The reaction between the sodium carbonate/bicarbonate with the citric acid forms sodium citrate that stabilizes sodium caseinate (e.g., from the foaming and non-foaming creamer) in solution when the instant coffee product is reconstituted in harder water.

Instant coffee products according to the present invention can optionally comprise thickening agents. These thickening agents include natural and synthetic gums, and natural and chemically modified starches. Suitable gums include locust bean gum, guar gum, gellan gum, xanthan gum, gum ghatti, modified gum ghatti, tragacanth gum, carrageenan, and/or anionic polymers derived from cellulose such as carboxymethylcellulose, sodium carboxymethylcellulose, cellulose gel (Avicel™), as well as mixtures of these gums. Suitable starches include pregelatinized starch (corn, wheat, tapioca), pregelatinized high amylose content starch, pregelatinized hydrolyzed starches (maltodextrins, corn syrup solids), chemically modified starches such as pregelatinized substituted starches (e.g., octenyl succinate modified starches such as N-Creamer, N-Lite LP, TEXTRA, etc.), as well as mixtures of these starches. These thickening agents enhance the body and mouthfeel characteristics of foamable instant coffee products according to the present invention, as well as helping to prevent sedimentation of the product when reconstituted, particularly when cocoa used in the formulation. These thickening agents can also be incorporated into these foamable instant coffee products as part of the creamer.

Instant coffee products according to the present invention can further comprise sweeteners. Preferred sweeteners for use in the present invention are sugars and sugar alcohols such as sucrose, fructose, dextrose, maltose, lactose, high fructose corn syrup solids, invert sugar, sugar alcohols, including sorbitol, as well as mixtures of these sugars and sugar alcohols. For low calorie instant coffee products of the present invention, lower calorie sweeteners, either alone or combination with other caloric sweeteners such as sugars can be used. These low calorie sweeteners include saccharin, cyclamates, acesulfame K (Sunette™), L-aspartyl-L-phenylalanine lower alkyl ester sweeteners (e.g., aspartame); L-aspartyl-D-alanine amides disclosed in U.S. Pat. No. 4,411,925 to Brennan et al.; L-aspartyl-D-serine amides disclosed in U.S. Pat. No. 4,399,163 to Brennan et al.; L-aspartyl-L-1-hydroxymethylalkaneamide sweeteners disclosed in U.S. Pat. No. 4,338,346 to Brand; L-aspartyl-1-hydroxyethylalkaneamide sweeteners disclosed in U.S. Pat. No. 4,423,029 to Rizzi; and L-aspartyl-D-phenylglycine ester and amide sweeteners disclosed in European Patent Application 168,112 to J. M. Janusz, published Jan. 15, 1986.; and the like and mixtures thereof. A particularly preferred lower calorie sweetener is aspartame. Also preferred are combinations of sucrose with aspartame and acesulfame K, for example a mixture of 99.2% sucrose, 0.4% aspartame and 0.4% acesulfame K. This mixture not only enhances sweetness, but also the overall flavor profile of the beverage without the characteristic aftertaste of the aspartame.

Instant coffee products of the present invention can optionally include a flavorant(s). Preferably, such flavors are sourced from encapsulated or liquid flavors. These flavors can be natural or artificial in origin. Preferred flavors include almond nut, amaraetto, anisette, brandy, cappuccino, mint, cinnamon, cinnamon almond, creme de menthe, grand mariner, peppermint stick, pistachio, sambuca, apple, chamomile, cinnamon spice, creme, creme de menthe, vanilla, french vanilla, Irish creme, kahlua, lemon, macadamia nut, orange, orange leaf, peach, strawberry, grape, raspberry, cherry, coffee, chocolate, cocoa, mocha and the like, aroma enhancers such as acetaldehyde, herbs, spices, as well as mixtures of these flavors.

Milk solids can also be included in the foamable instant coffee products according to the present invention. These milk solids can be prepared by drying milk to produce a mixture of the proteins, minerals, whey and other components of milk in a dry form. These solids can include butterfat solids and cream powder but are preferably low-fat dry milk and non-fat milk solids, i.e., the solids derived from milk that has had the fat removed. Any commercial source of non-fat or other milk solids can be used. Dry mixes used to prepare ice cream, milk-shakes, and frozen desserts can also be included in these instant flavored coffee products. These dry mixes provide a creamy, rich mouthfeel to the coffee beverage prepared when the products of the present invention are mixed with water. Flow aids such as silicon dioxide and silica aluminates and other starches can also be included to keep the various ingredients from caking.

C. Methods for Making Higher Density Foamable Instant Coffee Products

Various methods can be used for preparing the foamable instant coffee products of the present invention. Common to all these methods is densification of at least the non foaming creamer. The non-foaming creamer needs to be densified to at least about 0.5 g/cc, preferably at least about 0.55 g/cc. Typically, the non-foaming creamer is densified to from about 0.5 to about 0.6 g/cc.

The non-foaming creamer can also be densified as mixture along with the acid, the carbonate/bicarbonate salt, optionally the instant coffee and optionally the sweetener, typically as sugar. Suitable mixtures of this type typically comprise:

(1) from about 25 to about 98% (preferably from about 40 to about 96%) of the non-foaming creamer;

(2) from about 0.5 to about 3% (preferably from about 0.8 to about 2.5%) of the acid;

(3) from about 0.5 to about 3.5% (preferably from about 0.9 to about 3%) of the carbonate or bicarbonate salt;

(4) optionally from about 5 to about 20% (preferably from about 9 to about 15%) instant coffee;

(5) optionally from about 35 to about 60% (preferably from about 40 to about 55%) sweetener (preferably sugar).

This mixture is typically densified to at least about 0.7 g/cc, preferably at least about 0.75 g/cc, with a typical range of from about 0.7 to about 0.8 g/cc. Densification of these other components in addition to the non-foaming creamer is helpful in further increasing the density of final foamable instant coffee product. A preferred device for densification of the non-foaming creamer either alone or in combination with these other components is a Feeco compactor. The non foaming creamer should be maintained at temperatures not higher than 100° F. (37.8° C.) during the densification to avoid melting of the partially hydrogenated fats present in the creamer.

An alternative method for carrying out the process of the present invention is to extrude at least the instant coffee and the sweetener (sugar). (Extrusion of non foaming creamer is undesirable in that it will decrease the solubility of the creamer, or worse render it insoluble; the non-foaming creamer is compacted as before.) Extrusion of the instant coffee and sugar allows greater densification of these two components than is normally achievable by compaction. In an alternative embodiment, the acid is formulated as a mixture with the instant coffee and sugar that is then extruded. Suitable mixtures of this type comprise:

(1) from about 20 to about 50% (preferably from about 25 to about 35%) instant coffee;

(2) from about 50 to about 80% (preferably from about 60 to about 75%) sweetener (preferably sugar);

(3) from about 1 to about 6% (preferably from about 3 to about 5%) of the acid.

A preferred device for carrying out this extrusion step is a twin screw extruder (e.g., Baker Perkins or Werner-Pfleiderer). Extrusion of the instant coffee and sugar, with or without the acid and the carbonate/bicarbonate salt, is preferably carried at a temperature no higher than about 70° C. to avoid burnt flavors or off flavors.

This extruded material typically needs to be granulated and then particle sized before it is combined with the other ingredients in the foamable instant coffee product. This extruded material can be granulated and sized by using a vibratory screen, coffee granulator, low attrition mill, and the like to provide a narrow particle size distribution. The particle size of this granulated, sized material is typically in the range of from about #14 mesh (1400 microns) to about #100 mesh (150 microns).

The densified materials, including any extruded materials, are then mixed, blended, or otherwise combined together with the other ingredients (e.g., foaming creamer, proteinaceous foam stabilizer, flavorants, milk solids, thickener, flow aids, sweetener, etc.) in a paddle, drum, screw, plough type mixer, or the like to provide the final foamable instant coffee product. Suitable foamable instant coffee products according to the present invention comprise:

a. from about 1 to about 40% (preferably from about 7 to about 30%) of the instant coffee) having a density of at least about 0.2 g/cc, typically a density in the range of from about 0.2 to about 0.6 g/cc;

b. from about 10 to about 90% (preferably from about 20 to about 70%) of the densified non-foaming creamer;

c. from about 1 to about 20% (preferably from about 4 to about 15%) of the foaming creamer;

d. from about 0.1 to about 60% (preferably from about 0.5 to about 40%) of the proteinaceous foam stabilizer (If egg white albumin is the foam stabilizer, this amount is typically in the range of from about 0.1 to about 10%, preferably from about 0.5 to about 5%);

e. from about 0.1 to about 5% (preferably from about 0.5 to about 3%) of the acid;

f. from about 0.1 to about 5% (preferably from about 0.5 to about 3%) of the carbonate or bicarbonate salt;

g. optionally up to about 20% milk solids;

h. optionally from about 0.05 to about 10% (preferably from about 0.1 to about 5%) of the thickener;

i. optionally an effective amount of a sweetener;

j. optionally an effective amount of a flavorant.

The foamable instant coffee products of the present invention have a density of at least about 0.4 g/cc, preferably at least about 0.5 g/cc. Typically, these coffee products have a density of from about 0.55 to about 0.75 g/cc.

Foamable instant coffee products according to the present invention are preferably sugar sweetened. These sugar sweetened products typically comprise:

a. from about 1 to about 20% (preferably from about 7 to about 15%) of the instant coffee;

b. from about 10 to about 45% (preferably from about 20 to about 35%) of the densified non-foaming creamer;

c. from about 1 to about 10% (preferably from about 4 to about 8%) of the foaming creamer;

d. from about 0.1 to about 30% (preferably from about 0.5 to about 20%) of the proteinaceous foam stabilizer (If egg white albumin is the foam stabilizer, this amount is typically in the range of from about 0.1 to about 5%, preferably from about 0.5 to about 3%);

e. from about 0.1 to about 5% (preferably from about 0.5 to about 1.5%) of the acid;

f. from about 0.1 to about 3% (preferably from about 0.5 to about 1.5%) of the carbonate or bicarbonate salt;

g. optionally up to about 10% milk solids;

h. optionally from about 0.05 to about 5% (preferably from about 0.1 to about 3%) of the thickener;

i. from about 25 to about 60% (preferably from about 35 to about 55%) sugar;

j. optionally an effective amount of a flavorant.

The sugar sweetened foamable instant coffee products of the present invention have a density of at least about 0.5 g/cc, preferably at least about 0.6 g/cc. Typically, these sugar sweetened coffee products have a density of from about 0.55 to about 0.75 g/cc.

The foam developed by the instant coffee products of the present invention is evaluated by the following procedure.

Foam Height

Eighteen grams of the instant coffee product is measured in a 400 ml glass beaker (72 mm internal diameter) and 222 ml of hot water (170° F.) is added. The solution is stirred for 10 sec with a teaspoon. The solution is left undisturbed for 1 min. and the foam height developed is measured in millimeters. Typical foam height for the instant coffee products of the present invention is 4 to 5 mm.

Foam Formation and Stability

Seven and a half grams of the instant coffee product is measured in a 250 ml glass beaker and 92.5 milliliters of hot water (170° F., 77° C.) is added. The solution is stirred for 20 sec with a teaspoon. The stirred solution is poured into a 240 ml graduated cylinder and the foam in milliliters is read after 1, 5, 10, 15 and 20 min. Typical foam formation and stability for the instant coffee products of the present invention are: 6, 5, 4, 3, and 3 ml of foam after 1, 5, 10, 15 and 20 minutes respectively. Foam height, formation and stability values vary as the concentration of the foam generating system (foaming creamer, acid, carbonate/bicarbonate salt, and dried egg white) varies within the stated concentration ranges.

EXAMPLES

The following examples illustrate high density foamable instant coffee products made according to the present invention.

Example 1

The following ingredients are mixed together and compacted (densified) from an initial bulk density of 0.56 g/cc to a final bulk density of at least 0.75 g/cc using a Feeco Compactor (8 in. diameter and 50 in long) operating at 246 lb./h, 1500 rpm, 1.4 H.P., and cooled to a temperature of 40° F. (4° C.):

| Ingredient | % |
| --- | --- |
| Sucrose | 44.6 |
| Non Foaming Creamer | 41.7 |
| Instant Coffee | 11.6 |
| Citric Acid | 0.9 |
| Sodium Bicarbonate | 1.2 |

Five hundred grams of a vanilla flavored foamable instant coffee product with a uniform powder appearance and a bulk density of 0.64 g/cc is prepared by blending together the following ingredients:

| Ingredient | % |
| --- | --- |
| Compacted Mixture of Sucrose, Non Foaming Creamer, Instant Coffee, Citric Acid, Sodium Bicarbonate | 83.4 |
| Foaming Creamer | 4.4 |
| Non Fat Dry Milk | 4.4 |
| Flavors | 3.3 |
| Carboxymethylcellulose* | 1.6 |
| Silicon Dioxide | 1.0 |
| Dried Egg White | 1.9 |

*Milled and sized through a #100 mesh

Example 2

The following ingredients are mixed together and compacted (densified) from an initial bulk density of 0.48 g/cc to a final bulk density of at least 0.54 g/cc using a Feeco Compactor (8 in. diameter and 50 in long) operating at 186 lb./h, 1500 rpm, 1.6 H.P., and cooled to a temperature of 40° F. (4° C.):

| Ingredient | % |
| --- | --- |
| Non Foaming Creamer | 95.2 |
| Citric acid | 2.1 |
| Sodium Bicarbonate | 2.7 |

Five hundred grams of a vanilla flavored foamable instant coffee product with a uniform powder appearance and a bulk density of 0.65 g/cc is prepared by blending together the following ingredients:

| Ingredient | % |
| --- | --- |
| Compacted Non foaming Creamer, Citric Acid, and Sodium Bicarbonate | 36.5 |
| Sucrose | 37.1 |
| Instant Coffee* | 10.0 |
| Foaming Creamer | 4.3 |
| Non Fat Dry Milk | 4.3 |
| Flavors | 3.3 |
| Dried Egg White | 1.9 |
| Carboxymethylcellulose** | 1.6 |
| Silicon Dioxide | 1.0 |

*Milled in an Alpine Pin Mill running at 1900 RPM and 50% pin from initial bulk density of 0.237–0.293 g/cc, to final bulk density of 0.507–0.562 g/cc
**Milled and sized through #100 mesh screen Example 3

Five hundred grams of a vanilla flavored foamable instant coffee product with a variegated (non-uniform) appearance and a bulk density of 0.59 g/cc is prepared according Example 1 except that spray dried instant coffee with bulk densities of 0.237–0.293 g/cc is used in place of the milled instant coffee.

Example 4

Sucrose (75%), and instant coffee (25%) are mixed together and is then metered into the first zone of a Werner and Pfleiderer ZSK twin-screw extruder equipped with a 5 mm diameter double orifice die. The operating conditions of the extruder are shown in the following table:

| Parameter | |
| --- | --- |
| Feed rate (lb./h) | 5.0 |
| Screw Speed (rpm) | 450 |
| Torque (%) | 40 |
| Zone 1 Temperature (° C.) | 46 |
| Zone 2 Temperature (° C.) | 48 |
| Zone 3 Temperature (° C.) | 48 |
| Zone 4 Temperature (° C.) | 52 |
| Zone 5 Temperature (° C.) | 65 |

The molten extrudate is cooled at ambient temperature to allow it to solidify. The solidified extrudate is ground using a GrindMaster Model 495 coffee grinder. The ground mixture is then sized using # 14, # 16, # 30, # 100, and # 170 mesh screens. The particles retained on the # 14, # 30, and # 100 mesh screens are blended in a 1:1:1 ratio respectively to maximize the density of the granulated coffee/sucrose mixture.

Five hundred grams of a vanilla flavored foamable instant coffee product with a variegated (non-uniform) appearance and a bulk density of 0.64 g/cc is prepared by blending together the following ingredients:

| Ingredient | % |
| --- | --- |
| Compacted Non foaming creamer, Citric Acid and Sodium Bicarbonate* | 36.5 |
| Granulated Sucrose/Instant Coffee Mixture | 13.0 |
| Sucrose | 34.1 |
| Foaming Creamer | 4.3 |
| Non Fat Dry Milk | 4.3 |
| Flavors | 3.3 |
| Carboxymethylcellulose | 1.6 |
| Dried Egg White | 1.9 |
| Silicon Dioxide | 1.0 |

*Same as compacted mixtures of Examples 1 and 2.

Example 5

A non foaming creamer is compacted from an initial bulk density of 0.47 g/cc to a final bulk density of at least 0.54 g/cc using a Feeco Compactor (8 in. diameter and 50 in long) operating at 186 lb./h, 1500 rpm, 1.6 HP, and cooled to a temperature of 40° F. (4° C.).

Sixty five lb. of a vanilla flavored foamable instant coffee product having a variegated (non-uniform) appearance and a bulk density of 0.70 g/cc are prepared by blending together the following ingredients in a 140 l. (5 cu. ft) ribbon blender:

| Ingredient | % |
| --- | --- |
| Sucrose | 50.0 |
| Compacted Non Foaming Creamer | 22.1 |
| Regular Instant Folgers* | 10.0 |
| Foaming Creamer | 4.1 |
| Non Fat Dry Milk | 4.1 |
| Flavors | 4.1 |
| Carboxymethylcellulose** | 1.7 |
| Sodium Bicarbonate | 1.0 |
| Dried Egg White | 1.0 |
| Silicon Dioxide | 1.0 |
| Citric Acid** | 0.9 |

*Sized through a # 20 mesh screen
**Milled and sized through a #100 mesh screen

All of the ingredients except the foaming creamer and non fat dry milk are placed in the ribbon blender and mixed for 6 minutes. After this initial 6 minute period, the foaming creamer and non fat dry milk are added to the blender and mixed for a second 6 minute period.

Example 6

A non foaming creamer is compacted from an initial bulk density of 0.47 g/cc to a final bulk density of at least 0.54 g/cc using a Feeco Compactor (8 in. diameter and 50 in long) operating at 186 lb./h, 1500 rpm, 1.6 HP, and cooled to a temperature of 40° F. (4° C.).

Sixty five lb. of a chocolate flavored foamable instant coffee product having a uniform appearance and a bulk density of 0.69 g/cc is prepared by mixing the following ingredients in a 140 l. (5 cu. ft) ribbon blender:

| Ingredient | % |
| --- | --- |
| Sucrose | 23.0 |
| Fructose | 23.0 |
| Compacted Non Foaming Creamer | 18.2 |
| Chocolate Milk Crumb | 8.5 |
| Instant Coffee | 9.4 |
| Foaming Creamer | 4.4 |
| Non Fat Dry Milk | 4.4 |
| Cocoa Powder | 2.5 |
| Carboxymethylcellulose* | 1.9 |
| Flavors | 1.9 |
| Dried Egg White | 1.0 |
| Sodium Bicarbonate | 0.8 |
| Citric Acid* | 0.5 |
| Silicon Dioxide | 0.5 |

*Milled and sized through a #100 mesh screen.

All the ingredients except the foaming creamer and non fat dry milk are placed in the ribbon blender and mixed for 6 minutes. After this initial 6 minute period, the foaming creamer and non fat dry milk are added to the blender and mixed for a second 6 minute period.

What is claimed is:

1. A foamable coffee product having a density of at least about 0.4 g/cc, which comprises:
   a. from about 1 to about 40% instant coffee having a minimum density of about 0.2 g/cc;
   b. from about 10 to about 90% of a non-foaming creamer having a density of at least about 0.5 g/cc;
   c. from about 1 to about 20% of a foaming creamer;
   d. from about 0.1 to about 60% of a proteinaceous foam stabilizer selected from the group consisting of egg white albumin, whey protein, soy protein, soy protein isolate, corn protein isolate, and mixtures thereof;
   e. from about 0.1 to about 5% of an edible water-soluble acid; and
   f. from about 0.1 to about 5% of an edible water-soluble carbonate or bicarbonate salt that evolves carbon dioxide when it reacts with said acid.

2. The product of claim 1 wherein said density is a minimum of about 0.5 g/cc.

3. The product of claim 1 which has a density of from about 0.55 to about 0.75 g/cc.

4. The product of claim 1 which comprises:
   a. from about 7 to about 30% of said instant coffee;
   b. from about 20 to about 70% of said non-foaming creamer;
   c. from about 4 to about 15% of said foaming creamer;
   d. from about 0.5 to about 40% of said foam stabilizer;
   e. from about 0.5 to about 3% of said acid;
   f. from about 0.5 to about 3% of said carbonate or bicarbonate salt;
   g. up to about 20% milk solids;
   h. from about 0.05 to about 10% of a thickener;
   i. an effective amount of a sweetener;
   j. an effective amount of a flavorant.

5. The product of claim 4 wherein said foam stabilizer is egg white albumin in an amount of from about 0.5 to about 5%.

6. The product of claim 4 wherein said acid is selected from the group consisting of citric acid, malic acid, tartaric acid, fumaric acid, succinic acid, phosphoric acid, and mixtures thereof.

7. The product of claim 6 where said carbonate or bicarbonate salt is selected from the group consisting of sodium bicarbonate, sodium carbonate, potassium bicarbonate, potassium bicarbonate, and mixtures thereof.

8. The product of claim 7 wherein said carbonate or bicarbonate salt is selected from the group consisting of sodium carbonate and sodium bicarbonate and wherein said acid is citric acid.

9. The product of claim 4 wherein said thickening agent is selected from the group consisting of locust bean gum, guar gum, gellan gum, xanthan gum, gum ghatti, modified gum ghatti, tragacanth gum, carrageenan, anionic polymers derived from cellulose, pregelatinized starches, pregelatinized high amylose content starches, pregelatinized hydrolyzed starches, chemically modified starches, and mixtures thereof.

10. The product of claim 4 wherein the sweetener is selected from the group consisting of sugars, sugar alcohols, low calorie sweeteners and mixtures thereof.

11. The product of claim 4 wherein said non-foaming creamer is densified to from about 0.5 to about 0.6 g/cc.

12. A foamable coffee product having a minimum density of about 0.6 g/cc, which comprises:
    a. from about 1 to about 20% instant coffee having a density of at least about 0.2 g/cc;
    b. from about 10 to about 45% of a non-foaming creamer having a density of at least about 0.5 g/cc;
    c. from about 1 to about 10% of a foaming creamer;
    d. from about 0.1 to about 30% of a proteinaceous foam stabilizer;
    e. from about 0.1 to about 3% of an edible water-soluble acid; and
    f. from about 0.1 to about 3% of an edible water-soluble carbonate or bicarbonate salt that evolves carbon dioxide when it reacts with said acid;
    g. from about 25 to about 60% sugar.

13. The product of claim 12 which comprises:
    a. from about 7 to about 15% of said instant coffee;
    b. from about 20 to about 35% of said non-foaming creamer;
    c. from about 4 to about 8% of said foaming creamer;
    d. from about 0.5 to about 20% of said foam stabilizer;
    e. from about 0.5 to about 1.5% of said acid;
    f. from about 0.5 to about 1.5% of said carbonate or bicarbonate salt;
    g. from about 35 to about 55% of said sugar:
    h. up to about 10% milk solids;
    i. from about 0.05 to about 5% of a thickener;
    j. an effective amount of a flavorant.

14. The product of claim 13 which has a density of from about 0.6 to about 0.75 g/cc.

15. The product of claim 13 wherein said foam stabilizer is selected from the group consisting of egg white albumin, whey protein, soy protein, soy protein isolate, corn protein isolate, and mixtures thereof.

16. The product of claim 15 where said foam stabilizer is dried egg white in an amount of from about 0.5 to about 3%.

17. The product of claim 13 wherein said acid is selected from the group consisting of citric acid, malic acid, tartaric acid, fumaric acid, succinic acid, phosphoric acid, and mixtures thereof.

18. The product of claim 17 where said carbonate or bicarbonate salt is selected from the group consisting of sodium bicarbonate, sodium carbonate, potassium bicarbonate, potassium bicarbonate, and mixtures thereof.

19. The product of claim 13 wherein said thickening agent is selected from the group consisting of locust bean gum, guar gum, gellan gum, xanthan gum, gum ghatti, modified gum ghatti, tragacanth gum, carrageenan, anionic polymers derived from cellulose, pregelatinized starches, pregelatinized high amylose content starches, pregelatinized hydrolyzed starches, chemically modified starches, and mixtures thereof.

20. A foamable coffee product having a density of at least about 0.4 g/cc, which comprises:
    a. from about 1 to about 40% instant coffee having a density of at least about 0.2 g/cc;
    b. from about 10 to about 90% of a non-foaming creamer having a density of at least about 0.5 g/cc;
    c. from about 1 to about 20% of a foaming creamer;
    d. from about 0.1 to about 60% of a proteinaceous foam stabilizer;
    e. from about 0.1 to about 5% of an edible water-soluble acid; and
    f. from about 0.1 to about 5% of an edible water-soluble carbonate or bicarbonate salt that evolves carbon dioxide when it reacts with said acid;
    g. an effective amount of a sweetener consisting essentially of a low calorie sweetener.

21. The product of claim 20 which comprises:
    a. from about 7 to about 30% of said instant coffee;
    b. from about 20 to about 70% of said non-foaming creamer;
    c. from about 4 to about 15% of said foaming creamer;
    d. from about 0.5 to about 40% of said foam stabilizer;
    e. from about 0.5 to about 3% of said acid;
    f. from about 0.5 to about 3% of said carbonate or bicarbonate salt;
    g. up to about 20% milk solids;
    h. from about 0.05 to about 10% of a thickener;
    j. an effective amount of a flavorant.

* * * * *